(12) United States Patent
Fujisawa et al.

(10) Patent No.: US 11,656,724 B2
(45) Date of Patent: May 23, 2023

(54) DISPLAY DEVICE, DETECTION DEVICE AND WATCH

(71) Applicant: Japan Display Inc., Tokyo (JP)

(72) Inventors: Akihiko Fujisawa, Tokyo (JP); Kaoru Ito, Tokyo (JP); Daichi Abe, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/406,397

(22) Filed: Aug. 19, 2021

(65) Prior Publication Data

US 2022/0057872 A1    Feb. 24, 2022

(30) Foreign Application Priority Data

Aug. 20, 2020   (JP) .............................. JP2020-139300

(51) Int. Cl.
*G06F 3/044*   (2006.01)
*G06F 3/041*   (2006.01)
*G04G 21/08*   (2010.01)
*G02F 1/1333*  (2006.01)

(52) U.S. Cl.
CPC .......... *G06F 3/044* (2013.01); *G02F 1/13338* (2013.01); *G04G 21/08* (2013.01); *G06F 3/0412* (2013.01)

(58) Field of Classification Search
CPC ...... G06F 3/0412; G06F 3/0416; G06F 3/044; G02F 1/13338; G04G 21/08
See application file for complete search history.

(56) References Cited

U.S. PATENT DOCUMENTS

| | | | |
|---|---|---|---|
| 2014/0253501 A1* | 9/2014 | Noguchi | G06F 3/0446 345/174 |
| 2016/0098141 A1* | 4/2016 | Kang | G06F 1/3265 345/174 |
| 2017/0357118 A1* | 12/2017 | Cheng | G02F 1/13338 |
| 2018/0067591 A1* | 3/2018 | Lee | G06F 3/041662 |
| 2019/0012014 A1* | 1/2019 | Kudo | G02F 1/13338 |
| 2019/0094590 A1* | 3/2019 | Aoki | G09G 3/36 |
| 2019/0095008 A1 | 3/2019 | Murata et al. | |
| 2022/0100277 A1* | 3/2022 | Riihiaho | G06F 3/0412 |

FOREIGN PATENT DOCUMENTS

JP   2019-061563 A   4/2019

* cited by examiner

*Primary Examiner* — Hong Zhou
(74) *Attorney, Agent, or Firm* — K&L Gates LLP

(57) ABSTRACT

According to one embodiment, a display device includes a first substrate, a second substrate opposing the first substrate, a liquid crystal layer, at least one first detection electrode disposed in a display area and a plurality of second detection electrodes disposed in a peripheral area. In a display period in which images are displayed on the display area, a predetermined voltage is applied to the first detection electrode to drive the liquid crystal layer, and in a period in which the liquid crystal layer is not driven, the first detection electrode is set to a state of being not electrically connected to anywhere or being connected to a predetermined potential with an impedance of 50 kΩ or higher.

14 Claims, 15 Drawing Sheets

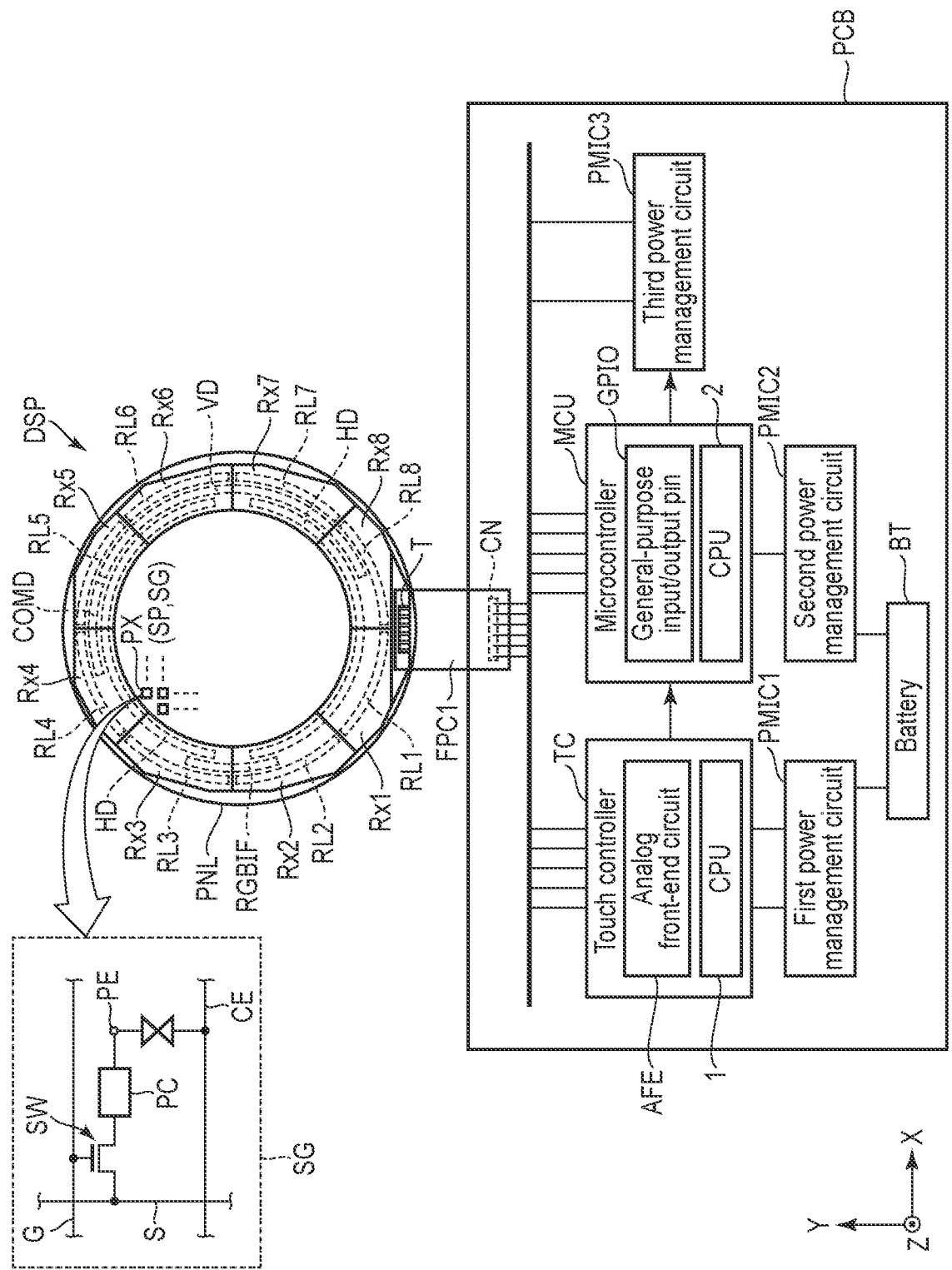
F I G. 1

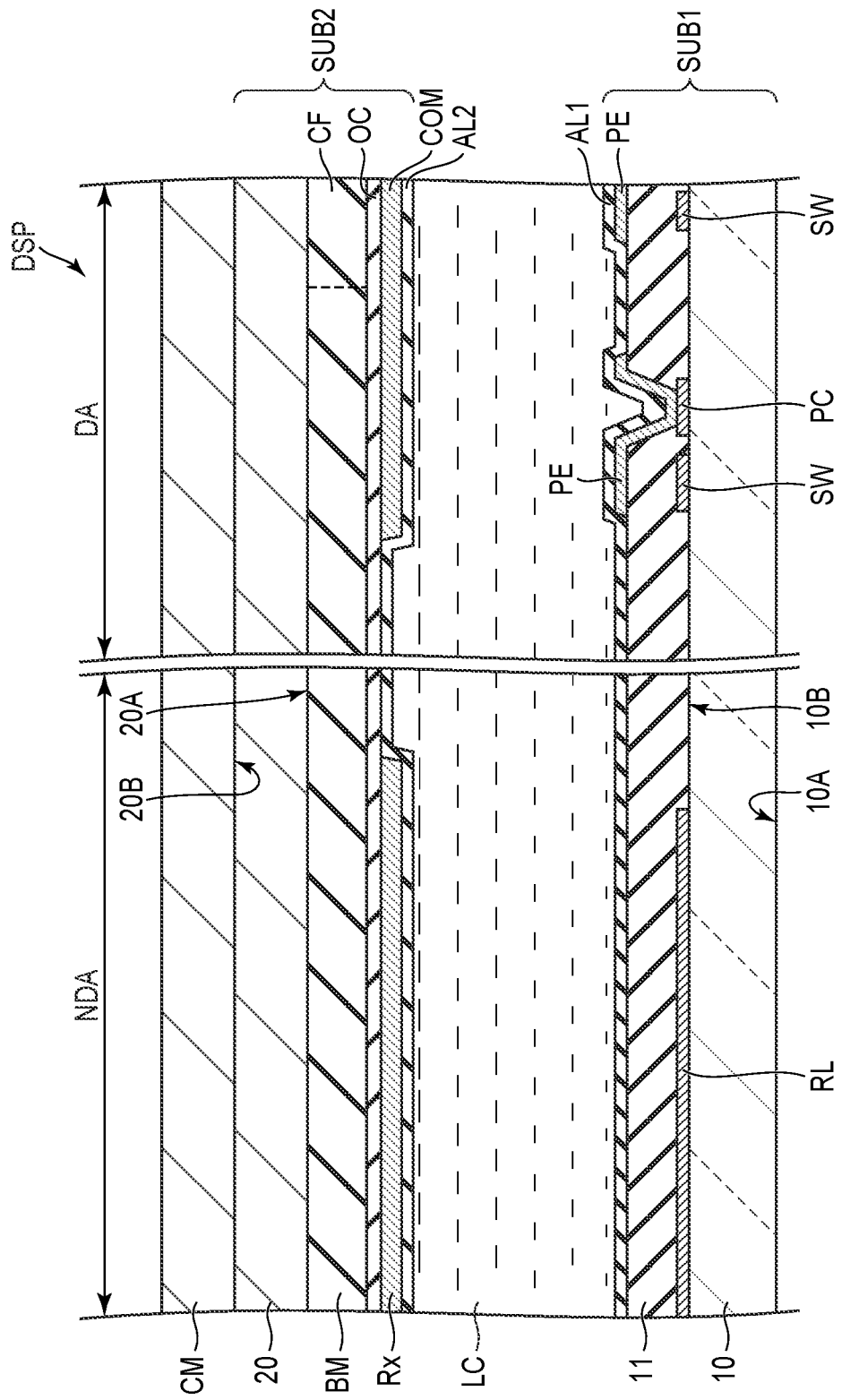
F I G. 2

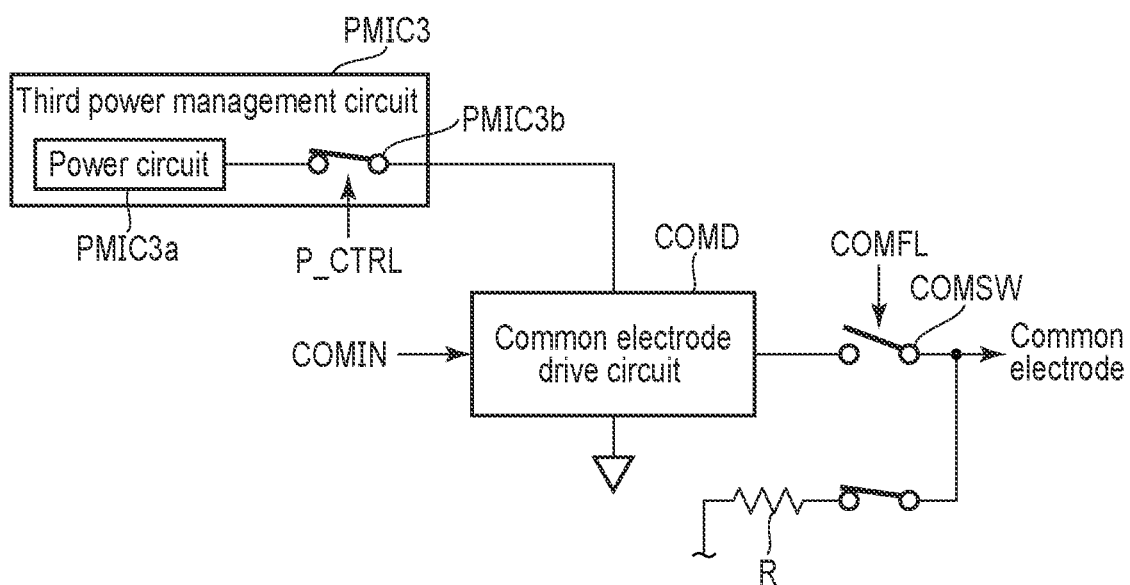
F I G. 5

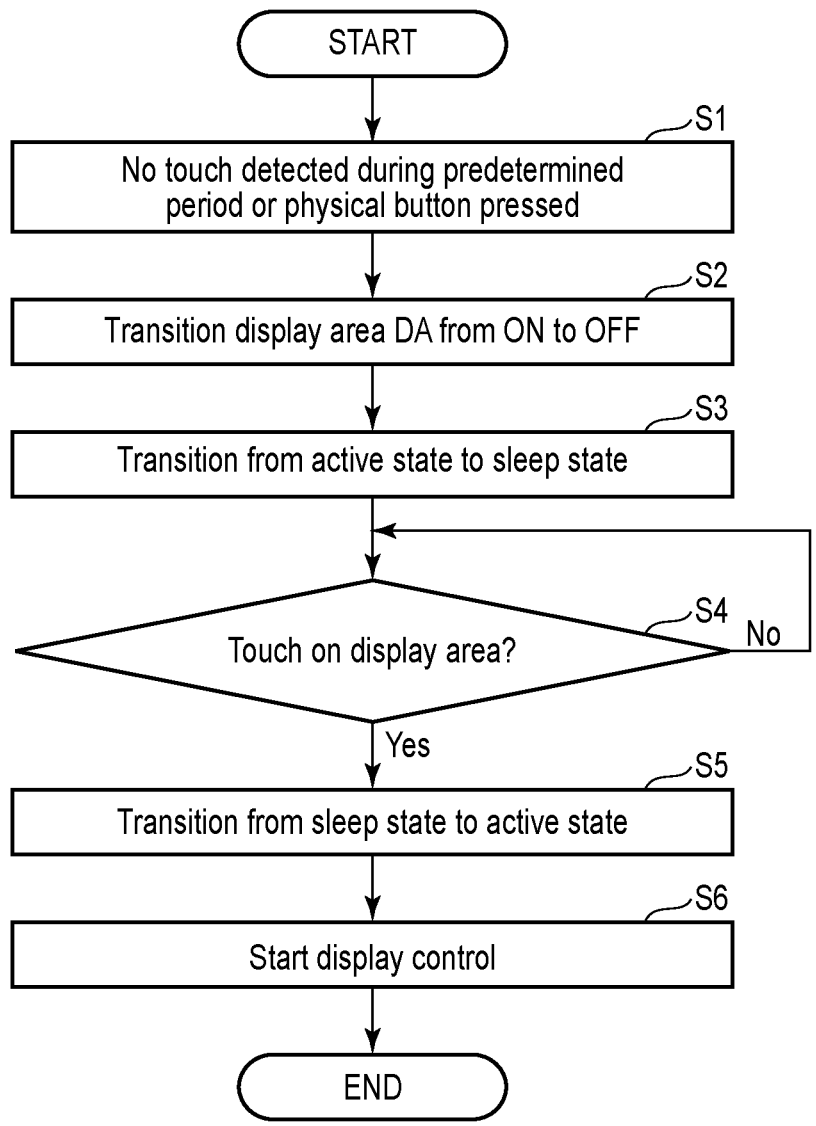
F I G. 9

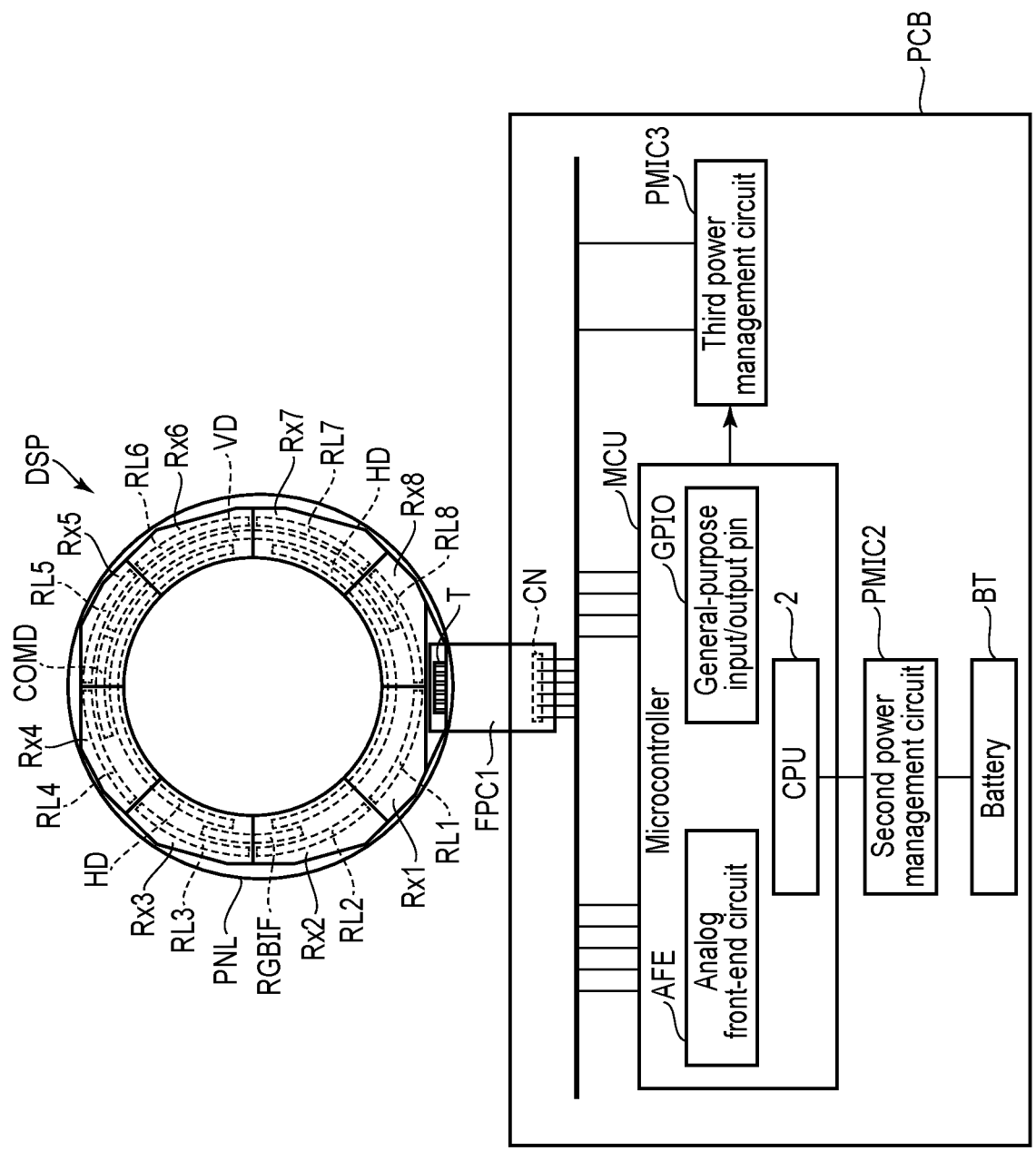
F I G. 12

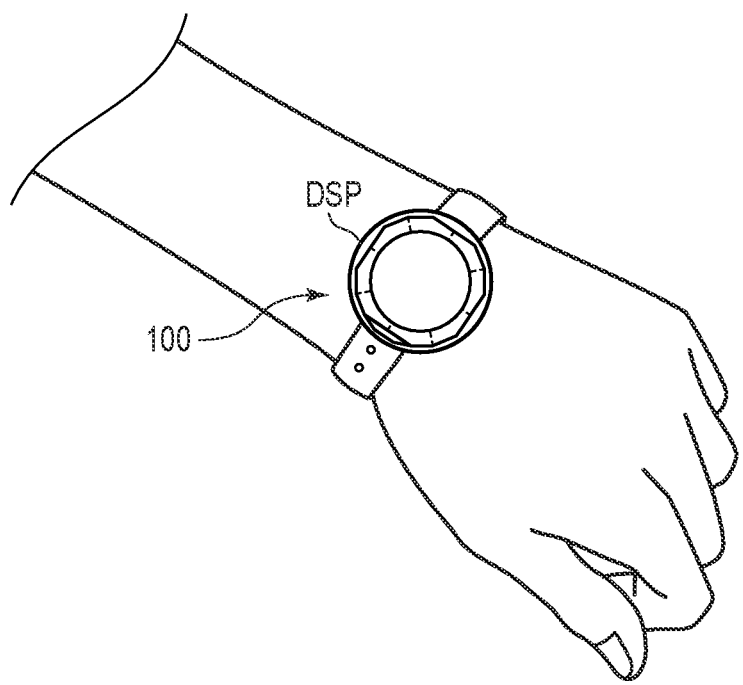
F I G. 15
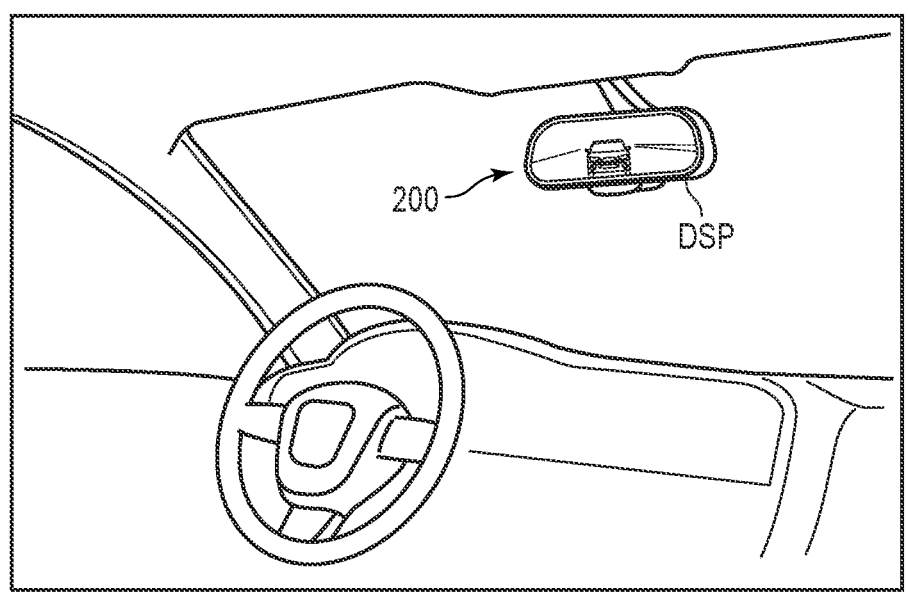
F I G. 16

DISPLAY DEVICE, DETECTION DEVICE AND WATCH

CROSS-REFERENCE TO RELATED APPLICATIONS

This application is based upon and claims the benefit of priority from Japanese Patent Application No. 2020-139300, filed Aug. 20, 2020, the entire contents of which are incorporated herein by reference.

FIELD

Embodiments described herein relate generally to a display device, a detection device and a watch.

BACKGROUND

In recent years, wearable devices with a touch detection function (e.g., wristwatch-type wearable devices, eyeglass-type wearable devices, etc.) have gradually been becoming popular. In such wearable devices, there is a need for both display quality when displaying images and excellent operability by touch, and various developments are progressing.

SUMMARY

The present disclosure relates generally to a display device, a detection device and a watch.

According to one embodiment, a display device includes a first substrate, a second substrate opposing the first substrate, a liquid crystal layer, at least one first detection electrode disposed in a display area and a plurality of second detection electrodes disposed in a peripheral area. In a display period in which images are displayed on the display area, a predetermined voltage is applied to the first detection electrode to drive the liquid crystal layer, and in a period in which the liquid crystal layer is not driven, the first detection electrode is set to a state of being not electrically connected to anywhere or being connected to a predetermined potential with an impedance of 50 kΩ or higher.

BRIEF DESCRIPTION OF THE DRAWINGS

FIG. 1 is a plan view showing a configuration example of a display device of the first embodiment.

FIG. 2 is a cross-sectional view showing a configuration example of the display device of this embodiment.

FIG. 5 is a diagram showing an example of a circuit configuration formed to set a common electrode of this embodiment in a high-impedance state.

FIG. 9 is a flowchart illustrating an example of the operation of the display device of this embodiment.

FIG. 12 is a plan view showing a configuration example of a display device of the second embodiment.

FIG. 15 is a diagram showing an example of application of the display device of each embodiment.

FIG. 16 is a diagram showing another example of application of the display device of each embodiment.

DETAILED DESCRIPTION

Figure 3:
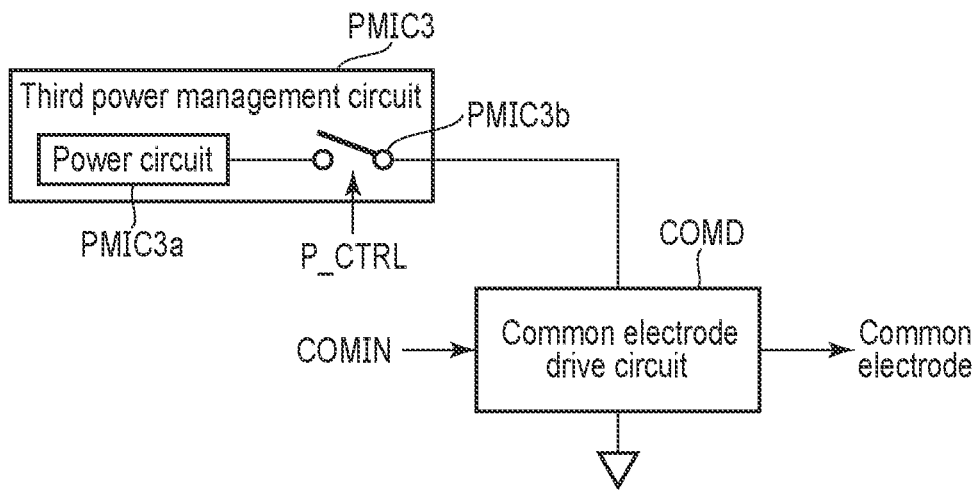
FIG. 3 is a diagram showing an example of a circuit configuration formed to set a common electrode of this embodiment in a high-impedance state.

In general, according to one embodiment, a display device comprises a first substrate, a second substrate opposing the first substrate, a liquid crystal layer held between the first substrate and the second substrate, at least one first detection electrode disposed in a display area which displays images and a plurality of second detection electrodes disposed in a peripheral area surrounding the display area, during a display period in which images are displayed in the display area, a predetermined voltage for driving the liquid crystal layer being applied to the first detection electrode, and in a period in which the liquid crystal layer is not driven, the first detection electrode is set to a state of being not electrically connected to anywhere or to a state of being connected to a predetermined potential with an impedance of 50 kΩ or higher.

According to another embodiment, a watch comprises the display device.

According to still another embodiment, a detection device comprises at least one first detection electrode and a plurality of second detection electrodes disposed in a peripheral area surrounding the first detection electrode, in a first period, a predetermined voltage being applied to the first detection electrode, and in a second period, which is different from the first period, the first detection electrode is set to a state of being not electrically connected to anywhere or being connected to a predetermined potential with an impedance of 50 kΩ or higher.

According to still another embodiment, a watch comprises the detection device.

Embodiments will now be described with reference to accompanying drawings.

Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the figures as compared to actual embodiments for the sake of simpler explanation, and they do not limit the interpretation of the invention of the present application. Furthermore, in the description and figures of the present application, structural elements having the same or similar functions will be referred to by the same reference numbers and detailed explanations of them that are considered redundant may be omitted.

First Embodiment

In this embodiment, as an example of the display devices, a display device with a touch detection function will be described. There are various touch detection methods, such as optical, resistive, capacitive, electromagnetic induction, and the like. Of these listed methods, the capacitive system is a detection system which utilizes the change in capacitance caused by the proximity or contact of an object (for example, a finger), and has such advantages that it has a relatively simple structure and low power consumption. In this document, a display device with a touch detection function using the capacitive system will be mainly described.

The capacitive system includes the mutual capacitive system, which generates an electric field between a pair of electrodes, a transmitting electrode (a drive electrode) and a receiving electrode (a detection electrode), arranged at a distance from each other, to detect the change in the electric field caused by the proximity or contact of an object, and the self-capacitive system, which utilizes a single electrode to detect the change in capacitance caused by the proximity or contact of an object. In this embodiment, a display device with a touch detection function that utilizes the self-capacitive system will be mainly described.

FIG. 1 is a plan view of an example of a display device DSP of the first embodiment. For example, a first direction X, a second direction Y and a third direction Z are orthogonal to each other, but they may intersect at an angle other than 90 degrees. The first direction X and the second direction Y correspond to the directions parallel to the main surface of the substrate constituting the display device DSP, and the third direction Z corresponds to the thickness direction of the display device DSP. In this specification, the direction toward the tip of the arrow indicating the third direction Z may be referred to as an upward direction, and the direction from the tip of the arrow to the opposite direction may be referred to as a downward direction. Further, in an assumption that an observation position for observing the display device DSP is located on the tip side of the arrow indicating the third direction Z, when looking from this observation position toward an X-Y plane defined by the first direction X and the second direction Y is referred to as planar view.

As shown in FIG. 1, the display device DSP comprises a display panel PNL, a flexible printed circuit FPC1 and a printed circuit board PCB. The display panel PNL and the printed circuit board PCB are electrically connected to each other via the flexible printed circuit FPC1. In more detail, a terminal portion T of the display panel PNL and a connection portion CN of the printed circuit board PCB are electrically connected to each other via the flexible printed circuit FPC1.

The display panel PNL comprises has a display area DA that displays images, and a frame-shaped non-display area NDA that surrounds the display area DA. The display area DA may be referred to as a display portion. The non-display area NDA may also be referred to as a peripheral area. In the display area DA, pixels PX are arranged. More specifically, in the display area DA, a large number of pixels PX are arranged in a matrix along the first direction X and the second direction Y. In this embodiment, the pixels PX each include red (R), green (G) and blue (B) sub-pixels SP. Further, each sub-pixel SP includes a plurality of segment pixels SG. The segment pixels SG comprise pixel electrodes having areas different from each other, and by switching display/non-display of these multiple segment pixels SG, a gradation is formed for each sub-pixel SP.

Of two concentric circles shown in FIG. 1, the region of the inner circle corresponds to the display area DA, and the region of the outer circle excluding the inner circle corresponds to the non-display area NDA. This embodiment is described in connection with an example case where the display area DA is circular and the non-display area NDA surrounding the display area DA is also of a similar type of shape, but the embodiment is not limited to this case. The display area DA need not necessarily be circular and the non-display area NDA may be of a different type of shape from that of the display area DA. For example, the display area DA and the non-display area NDA may be polygonal in shape. Further, when the display area DA is polygonal, the non-display area NDA may be of a different type of shape from that of the display area DA, for example, circular.

As shown in FIG. 1, the display device DSP comprises a horizontal driver HD, a vertical driver VD, a pixel signal supply circuit RGBIF and a common electrode drive circuit COMD in the non-display area NDA. These various circuits and the detection electrodes Rx1 to Rx8 overlap each other in planar view. These various circuits are electrically connected to the flexible printed circuit FPC1 via wires (not shown) extending from each to the terminal portion T. The horizontal driver HD may be referred to as a signal line drive circuit or source driver or the like. The vertical driver VD may be referred to as a scanning line drive circuit, gate driver or the like.

As shown in enlarged view in FIG. 1, the segment pixels SG each comprises a switching element SW, a pixel circuit PC, a pixel electrode PE, a common electrode COM, a liquid crystal layer LC, and the like. The switching element SW is formed, for example, from a thin-film transistor (TFT) and is electrically connected to a scanning line G and a signal line S. The scanning line G is connected to the first signal line S. The scanning line G is electrically connected to the switching element SW in each of the segment pixels SG arranged along the first direction X. The signal line S is electrically connected to the switching element SW in each of the segment pixels SG arranged along the second direction X. The pixel electrode PE is electrically connected to the respective switching element SW via a respective pixel circuit PC. Each of the pixel electrodes PE opposes the common electrode COM, and the liquid crystal layer LC is driven by an electric field generated between the respective pixel electrode PE and the common electrode COM. The scanning line G is electrically connected to the vertical driver VD described above, and the signal line S is electrically connected to the horizontal driver HD described above.

FIG. 2 is a cross-sectional view showing a configuration example of a display device DSP. In the following description, the configuration of the display area DA side and the configuration of the non-display area NDA side will be described respectively.

The display device DSP comprises a first substrate SUB1, a second substrate SUB2, a liquid crystal layer LC and a cover member CM. The first substrate SUB1 and the second substrate SUB2 are each formed into a flat plate shape parallel to the X-Y plane. The first substrate SUB1 and the second substrate SUB2 are superimposed in planar view and bonded by a sealant (not shown). The liquid crystal layer LC is held between the first substrate SUB1 and the second substrate SUB2 and is sealed by the sealant.

FIG. 2 illustrates an example case where the display device DSP is a reflective display device in which no backlight unit is provided, but the embodiment is not limited to this. The display device DSP may be a display device which employs organic EL as pixels or a transmissive display device in which a backlight unit is disposed. Or, the display device DSP may be a display device in which a reflective type and a transmissive type are combined. Various forms of backlight units can be used, for example, those using light-emitting diodes (LEDs) as the light source, and those using cold cathode tubes (CCFLs).

As shown in FIG. 2, on the display area DA side, the first substrate SUB1 comprises a transparent substrate 10, switching elements SW, pixel circuits PC, a planarizing film 11, pixel electrodes PE and an alignment film AL1. In addition to the above-described structure, the first substrate SUB1 comprises scanning lines G, signal lines S, etc., shown in FIG. 1, but these are omitted from FIG. 2.

The transparent substrate 10 comprises a main surface (a lower surface) 10A and a main surface (an upper surface) 10B on an opposite side to the main surface 10A. The switching elements SW and the pixel circuits PC are placed on the main surface 10B side. The planarizing film 11 is constituted by at least one or more insulating films, and covers the switching elements SW and the pixel circuits PC. The pixel electrodes PE are placed on the planarizing film 11 and are connected to the respective pixel circuits PC through respective contact holes formed in the planarizing film 11. A switching element SW, a pixel circuits PC and a pixel electrodes PE are arranged for each segment pixel SG. The alignment film AL1 covers the pixel electrodes PE and is in contact with the liquid crystal layer LC.

In FIG. 2, the switching elements SW and the pixel circuits PC are illustrated in a simplified manner, but in reality, the switching elements SW and the pixel circuits PC include semiconductor layers and electrodes of various layers. Further, although the illustration is omitted from FIG. 2, the switching elements SW and the pixel circuits PC are electrically connected to each other, respectively. Furthermore, as described above, the scanning lines G and the signal lines S, illustrations of which are omitted from FIG. 2, are disposed, for example, between the transparent substrate 10 and the planarizing film 11.

On the display area DA side, the second substrate SUB2 comprises a transparent substrate 20, color filters CF, an overcoat layer OC, common electrodes COM and an alignment film AL2, as shown in FIG. 2.

The transparent substrate 20 comprises a main surface (a lower surface) 20A and a main surface (an upper surface) 20B on the opposite side to the main surface 20A. The main surface 20A of the transparent substrate 20 opposes the main surface 10B of the transparent substrate 10. The color filters CF are disposed on the main surface 20A side of the transparent substrate 20. The color filters CF includes a red color filter, a green color filter, a blue color filter, and the like. The overcoat layer OC covers the color filters CF. The common electrodes COM are each disposed over a plurality of segment pixels SG (plurality of pixels PX) and oppose the pixel electrodes PE respectively along the third direction Z. The common electrodes COM are disposed on the overcoat layer OC. The alignment film AL2 covers the common electrodes COM and is in contact with the liquid crystal layer LC. Note that FIG. 2 illustrates a configuration of the second substrate SUB2 on the display area DA side, in which no light-shielding films, which compartmentalize into each segment pixel SG. But, such a configuration may as well be adopted, in which light-shielding films are provided for compartmentalization into each segment pixel SG and the light-shielding films partially overlap the respective color filters CF.

The liquid crystal layer LC is disposed between the main surface 10A and the main surface 20A.

The transparent substrates 10 and 20 are insulating substrates, for example, glass substrates or plastic substrates. The planarizing film 11 is formed by a transparent insulating material, for example, silicon oxide, silicon nitride, silicon oxynitride or acrylic resin. For example, the planarizing film 11 includes an inorganic insulating film and an organic insulating film. The pixel electrodes PE are each formed as a reflective electrode, which has a three-layer stacked structure of, for example, indium zinc oxide (IZO), silver (Ag) and indium zinc oxide (IZO). The common electrodes COM each are a transparent electrode formed of a transparent conductive material such as indium tin oxide (ITO) or indium zinc oxide (IZO), for example. The alignment films AL1 and AL2 are horizontal alignment films having an alignment restriction force substantially parallel to the X-Y plane. The alignment restriction force may be imparted by rubbing treatment or by optical alignment treatment.

The Rx wiring layers RL are disposed on the transparent substrate 10. The Rx wiring layers RL are illustrated in a simplified form for convenience in FIG. 2, but as described above, the Rx wiring layers RL include terminal portions (pads) and Rx wiring lines extending from the terminal portions to the terminal portions T, and are electrically connected respectively to the detection electrodes Rx disposed on the second substrate SUB2 side via a conductive material.

On the non-display area NDA side, the second substrate SUB2 comprises a transparent substrate 20, a light-shielding film BM, an overcoat layer OC, detection electrodes Rx, and an alignment film AL2, as shown in FIG. 2. In the following description, the details of the structure already described in the display area DA side will be omitted.

On the main surface 20A side of the transparent substrate 20, the light-shielding film BM is provided.

The light-shielding film BM is disposed over substantially the entire surface of the non-display area NDA. The overcoat layer OC covers the light-shielding film BM along with the color filters CF on the display area DA side. The detection electrodes Rx are placed on the overcoat layer OC. In the configuration shown in FIG. 2, the detection electrodes Rx are disposed in the same layer as that of the common electrodes COM on the display area DA side, and are formed, for example, by the same transparent conductive material as that of the common electrodes COM. The alignment film AL2 covers the detection electrodes Rx and is in contact with the liquid crystal layer LC.

Note that FIG. 2 illustrates a configuration example in which the liquid crystal mode, which is classified into two according to the direction of application of the electric field to vary the alignment of the liquid crystal molecules contained in the liquid crystal layer LC, is the so-called vertical electric field mode, but this configuration is also applicable to the case where the liquid crystal mode is the so-called horizontal electric field mode. The vertical electric field mode described above includes, for example, twisted nematic (TN) mode, vertical alignment (VA) mode or the like. The horizontal electric field mode described above includes, for example, the In-Plane Switching (IPS) mode, a fringe field switching (FFS) mode, which is one of the IPS modes, or the like. When the horizontal electric field mode is adopted, the common electrodes COM located in the display area are provided on the first substrate SUB1 side and oppose the pixel electrodes PE, respectively, via a thin insulating layer.

FIG. 3 shows an example of the circuit configuration for setting the common electrodes COM in a high impedance state. As shown in FIG. 3, the third power management circuit PMIC3 includes a power circuit PMIC3a and a switch PMIC3b. The third power management circuit PMIC3 is a circuit that supplies power voltage to various circuits located in the display panel PNL, and as shown in FIG. 3, it is also connected to the common electrode drive circuit COMD. The common electrode drive circuit COMD is connected to the common electrodes COM, which are arranged over the entire surface of the display area DA, and supplies drive pulses to the common electrodes COM. As shown in FIG. 3, the common electrode drive circuit COMD is grounded.

As shown in FIG. 3, when the switch PMIC3*b* is turned off by the control signal P_CTRL from the microcontroller MCU, the third power management circuit PMIC3 is in a high-impedance state or at the ground potential, as described above. With this structure, the common electrode drive circuit COMD connected to the third power management circuit PMIC3 is not driven, no drive pulse is supplied to the common electrode COM, and thus the common electrode COM can be set in a high impedance state or floating state.

Note that FIG. 3 shows a configuration example in which the third power management circuit PMIC3 includes the switch PMIC3*b*, but the configuration of the third power management circuit PMIC3 is not limited to this. The third power management circuit PMIC3 may not include the switch PMIC3*b*. In this case, the third power management circuit PMIC3 is set in a high impedance state or at the ground potential when the power circuit PMIC3*a* is off. In this configuration as well, it is still possible to set the third power management circuit PMIC3 in a high impedance state or at the ground potential, and therefore, the common electrode COM can be set in a high impedance state or floating state.

Figure 4:
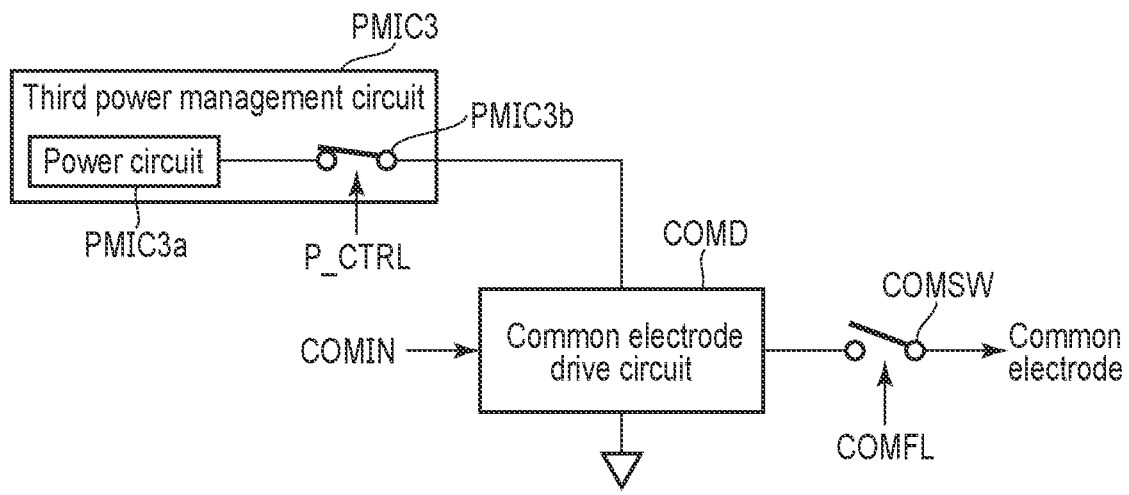
FIG. 4 is a diagram showing an example of a circuit configuration formed to set a common electrode of this embodiment in a high-impedance state.

For example, as shown in FIG. 4, such a circuit configuration may as well applied, that a switch COMSW is provided between the common electrode drive circuit COMD and the common electrode COM to switch over connection/disconnection between the common electrode drive circuit COMD and the common electrodes COM. The on/off operation of the switch COMSW is controlled, for example, by the control signal COMFL from the microcontroller MCU. In the case of the circuit configuration shown in FIG. 4, when the switch COMSW is turned off, drive pulses are not supplied to the common electrodes COM from the common electrode drive circuit COMD, and therefore the common electrodes COM can be set in the floating state.

Alternatively, as shown in FIG. 5, such a circuit configuration may as well be applied, that a switch COMSW may be provided between the common electrode drive circuit COMD and the common electrodes COM, and a resistance R of 50 kΩ or higher is connected to the common electrodes COM. The on/off operation of the switch COMSW is controlled by the control signal COMFL from the microcontroller MCU, for example, in the same way as the circuit configuration shown in FIG. 4. In this case, when the switch COMSW is turned off, drive pulses are not supplied to the common electrode COM from the common electrode drive circuit COMD, while a resistance R of 50 kΩ or higher is connected to the common electrodes COM, and therefore the common electrode COM can be biased at 50 kΩ or higher, that is, connected to a predetermined potential with an impedance of 50 kΩ or higher.

Note that the circuit configuration is not limited to the circuit configurations shown in FIGS. 3 to 5, but may be of any type as long as it can make the common electrodes COM in a high-impedance state, a floating state, or a state biased at 50 kΩ or higher, that is, being connected to a predetermined potential with an impedance of 50 kΩ or higher.

Next, referring to the timing chart in FIG. 6, an example of the operation to detect a touch on the display area DA using the detection electrodes Rx1 to Rx8 will be described. Note that the left side of FIG. 6 shows the state of various configurations when the display area DA is off, and the right side of FIG. 6 shows the state of various configurations when the display area DA is on.

Figure 6:
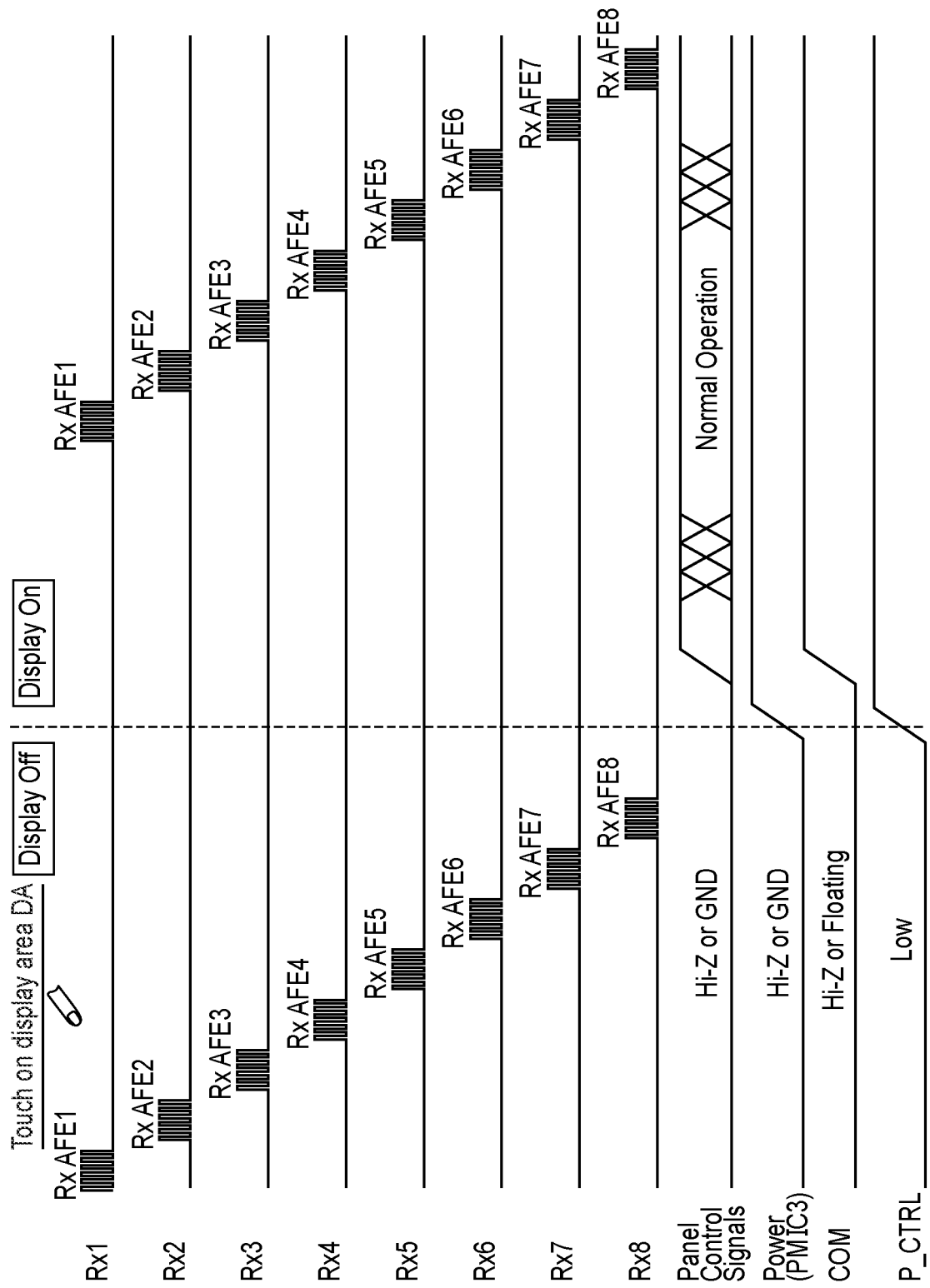
FIG. 6 is a timing chart illustrating an example of the operation of the display device of this embodiment.

As shown in FIG. 6, when the display area DA is off, the control signal P_CTRL output from the microcontroller MCU is low and the switch PMIC3*b* in the third power management circuit PMIC3 is turned off, and therefore the third power management circuit PMIC3 is turned off and the third power management circuit PMIC3 is placed at a high impedance state or the ground potential. With this structure, the common electrode drive circuit COMD is not driven as described above, and therefore no drive pulses are supplied to the common electrode COM, and the common electrodes COM are set in a high-impedance state or floating state (or biased at 50 kΩ or higher as will be described below) as shown in FIG. 6.

The touch controller TC obtains the detection signals RxAFE1 to RxAFE8 from the detection electrodes Rx1 to Rx8, and when a touch on the display area DA is detected, the touch of the display area DA is notified to the microcontroller MCU. The notification from the touch controller TC to the microcontroller MCU will be described later, and therefore the detailed explanation thereof is omitted here.

When the microcontroller MCU receives a notification of the touch on the display area DA from the touch controller TC, the control signal P_CTRL to the switch PMIC3*b* included in the third power management circuit PMIC3 transitions from Low to High, thus turning on the switch PMIC3*b*, as shown in FIG. 6. With this structure, the third power management circuit PMIC3 transitions from off to on as shown in FIG. 6. When the third power management circuit PMIC3 is turned on, the display DA transitions from off to on (that is, from a period in which the liquid crystal layer LC is not driven to a display period in which the liquid crystal layer LC is driven). When the third power management circuit PMIC3 is turned on, the power voltage is supplied to the common electrode drive circuit COMD, and the common electrode drive circuit COMD is driven, and therefore drive pulses are supplied to the common electrode COM and a predetermined voltage is applied to the common electrode COM, as shown in FIG. 6. Further, the microcontroller MCU starts the display control (normal operation) for displaying images on the display area DA. During display control, various display panel control signals PCS transition to High or Low as appropriate. In FIG. 6, for convenience, the state of the various display panel control signals PCS transitioning to High or Low as appropriate is indicated as "normal operation".

Figure 7:
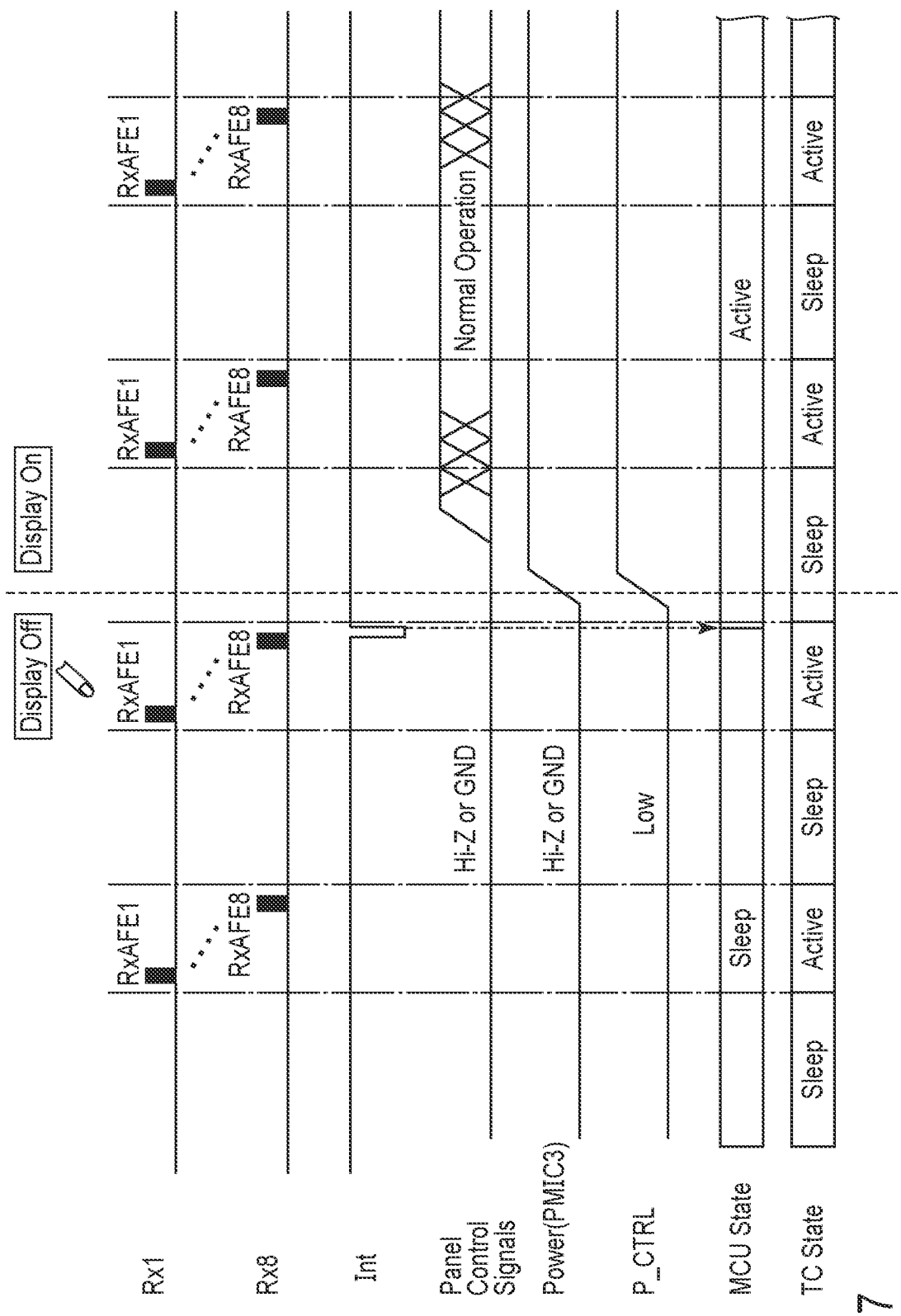
FIG. 7 is a timing chart illustrating an example of the operation of the display device of this embodiment.

The state of the transitions of the touch controller TC and the microcontroller MCU will now be described in detail with reference to the timing chart in FIG. 7. FIG. 7 is an example of the operation of detecting a touch on the display area DA using the detection electrodes Rx1 to Rx8, and is a timing chart mainly for explaining the state transition of the touch controller TC and the microcontroller MCU.

As shown in FIG. 7, the touch controller TC makes state transitions so that it alternately repeats a sleep state and an active state regardless of whether the display DA is on or off. When in the active state, the touch controller TC supplies drive signals to the detection electrodes Rx1 to Rx8 and acquires the detection signals RxAFE1 to RxAFE8 of waveforms corresponding to the drive signals from the detection electrodes Rx1 to Rx8. The touch controller TC detects a touch when a predetermined variation is observed in the waveforms of the acquired detection signals RxAFE1 to RxAFE8. In more detail, in the case where a predetermined variation is observed in the waveform of the detection signals RxAFE1 to RxAFE8 when the display area DA is off, the touch controller TC detects the touch on the display area DA. The touch controller TC may detect a touch on the display area DA when a predetermined variation is observed in the waveforms of a predetermined number or more (for example, three or more) of the detection signals RxAFE1 to RxAFE8 that are acquired when the display area DA is off.

On the other hand, in the case where a predetermined variation is observed in the waveforms of the detection signals RxAFE1 to RxAFE8 when the display DA is on, the touch controller TC detects a touch on the detection electrode Rx corresponding to the detection signal RxAFE for which a predetermined variation is observed in its waveform.

As shown in FIG. 7, the microcontroller MCU is in the sleep state when the display DA is off, and transitions to the active state when a touch on the display DA is detected by the touch controller TC. In more detail, as shown in FIG. 7, when the display area DA is off, the touch controller TC detects a touch on the display area DA, and then when an interrupt signal Int is supplied from the touch controller TC, the microcontroller MCU transitions from the sleep state to the active state.

When the microcontroller MCU transitions from the sleep state to the active state, it operates thereafter in a similar manner to that of the case of the timing chart shown in FIG. 6. More specifically, the microcontroller MCU transitions the control signal P_CTRL to the switch PMIC3b included in the third power management circuit PMIC3, from Low to High and turns on the switch PMIC3b. With this structure, the third power management circuit PMIC3 transitions from off to on as shown in FIG. 7. When the third power management circuit PMIC3 is turned on, the display DA transitions from off to on. When the third power management circuit PMIC3 is turned on, the power voltage is supplied to the various circuits located in the display panel PNL, and thus the display control (normal operation) for displaying images on the display area DA is started.

Figure 8:
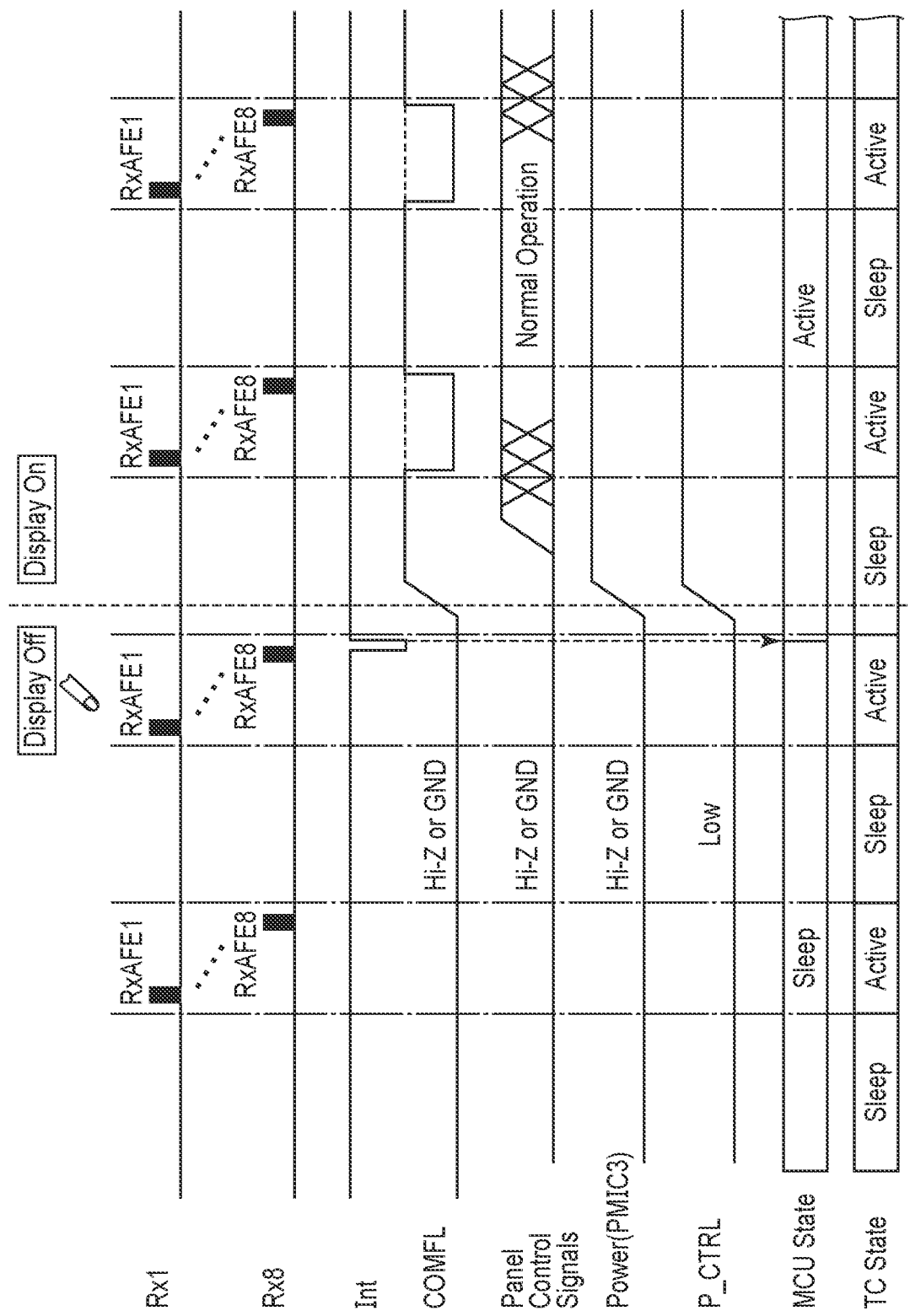
FIG. 8 is a timing chart illustrating an example of the operation of the display device of this embodiment.

In FIGS. 6 and 7, it is assumed that when the display area DA is turned on, the display control for displaying images on the display area DA is started, and a predetermined voltage for driving the liquid crystal layer LC is applied to the common electrode COM at all times. Therefore, in the case where the circuit configuration shown in FIG. 4 or FIG. 5 is applied as a circuit configuration to make the common electrodes COM in a high impedance state, floating state, or biased at 50 kΩ or higher, that is, being connected to a predetermined potential with an impedance of 50 kΩ or higher, when the display area DA is turned on, the control signal COMFL to the switch COMSW shows High at all times, and the switch COMSW is on at all times. However, as shown in the timing chart in FIG. 8, even when the display area DA is on, the control signal COMFL to the switch COMSW may transition from High to Low when the microcontroller MCU is in the active state, and the switch COMSW may be temporarily turned off. With this structure, even when the display area DA is on, the common electrode COM can be temporarily set to a high-impedance state, a floating state, or a state biased at 50 kΩ or higher, that is, being connected to a predetermined potential with an impedance of 50 kΩ or higher. In other words, it is possible to detect a touch on the display area DA even when the display area DA is on. Note that as indicated by the dotted line in the timing chart in FIG. 8, the control signal COMFL to the switch COMSW may indicate High at all times when the display area DA is on.

Next, referring to the flowchart in FIG. 9, an example of the operation of the display device DSP in this embodiment, that is, the display device DSP with the function of detecting a touch on the display area DA when the display area DA is off and transitioning the display area DA from off to on, will be described.

First, when no touch is detected by (the touch controller TC of) the display device DSP for a predetermined period of time (Step S1), or when a physical button (not shown) for transitioning the display device DSP to the sleep state is pressed (Step S1), (the microcontroller MCU of) the display device DSP transitions the display area DA from ON to OFF (Step S2). When the display area DA is turned off, the display device DSP transitions from the active state to the sleep state (Step S3). When the display device DSP transitions from the active state to the sleep state, the common electrode COM located in the display area DA is set in the high impedance state or floating state. The sleep state may also be referred to as a low power consumption mode.

The (touch controller TC of the) display device DSP periodically supplies drive signals to the detection electrodes Rx1 to Rx8 to detect a touch or non-touch on the display area DA even in the sleep state (Step S4).

Figure 10:
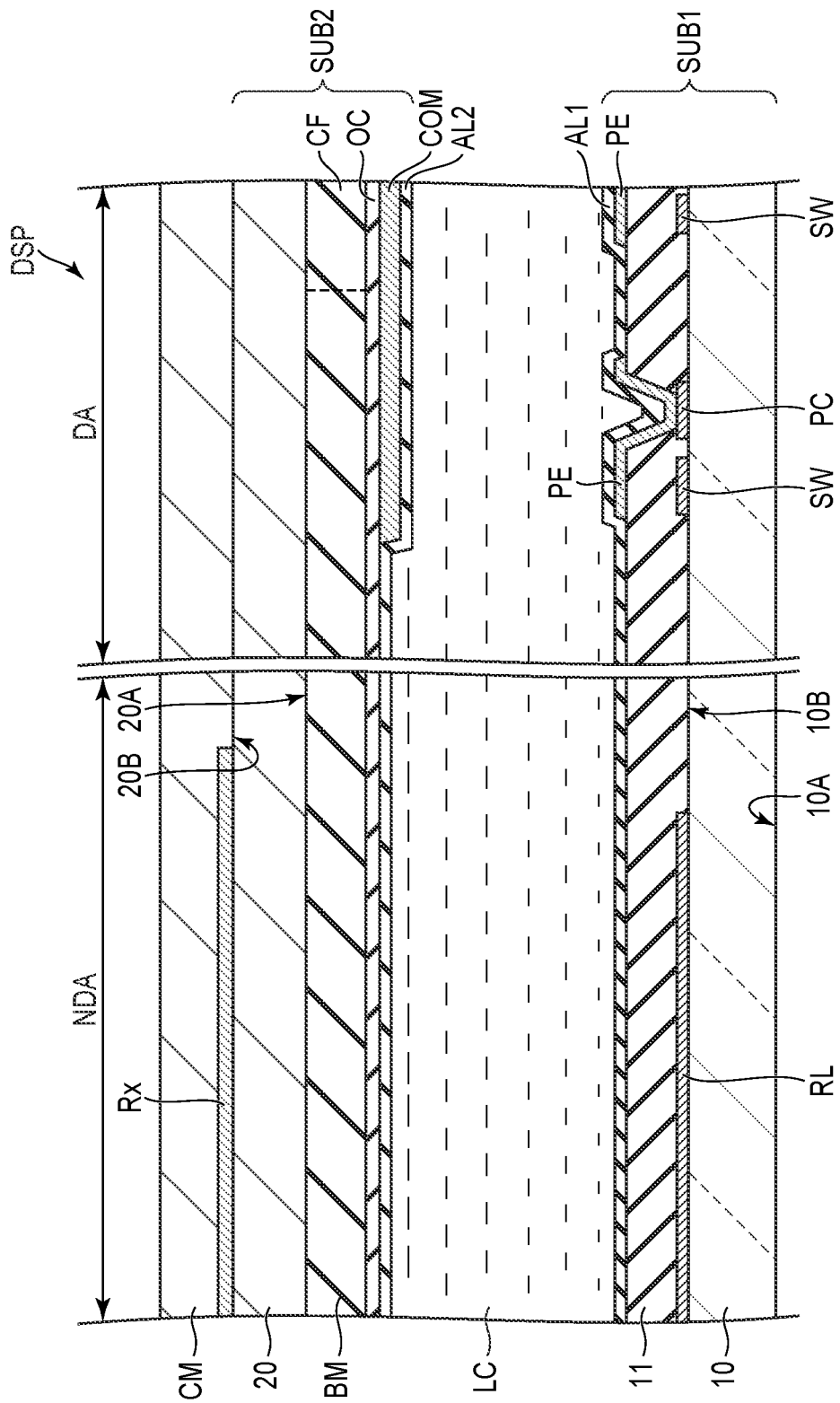
FIG. 10 is a cross-sectional view showing a configuration example of the display device of the embodiment.
Figure 11:
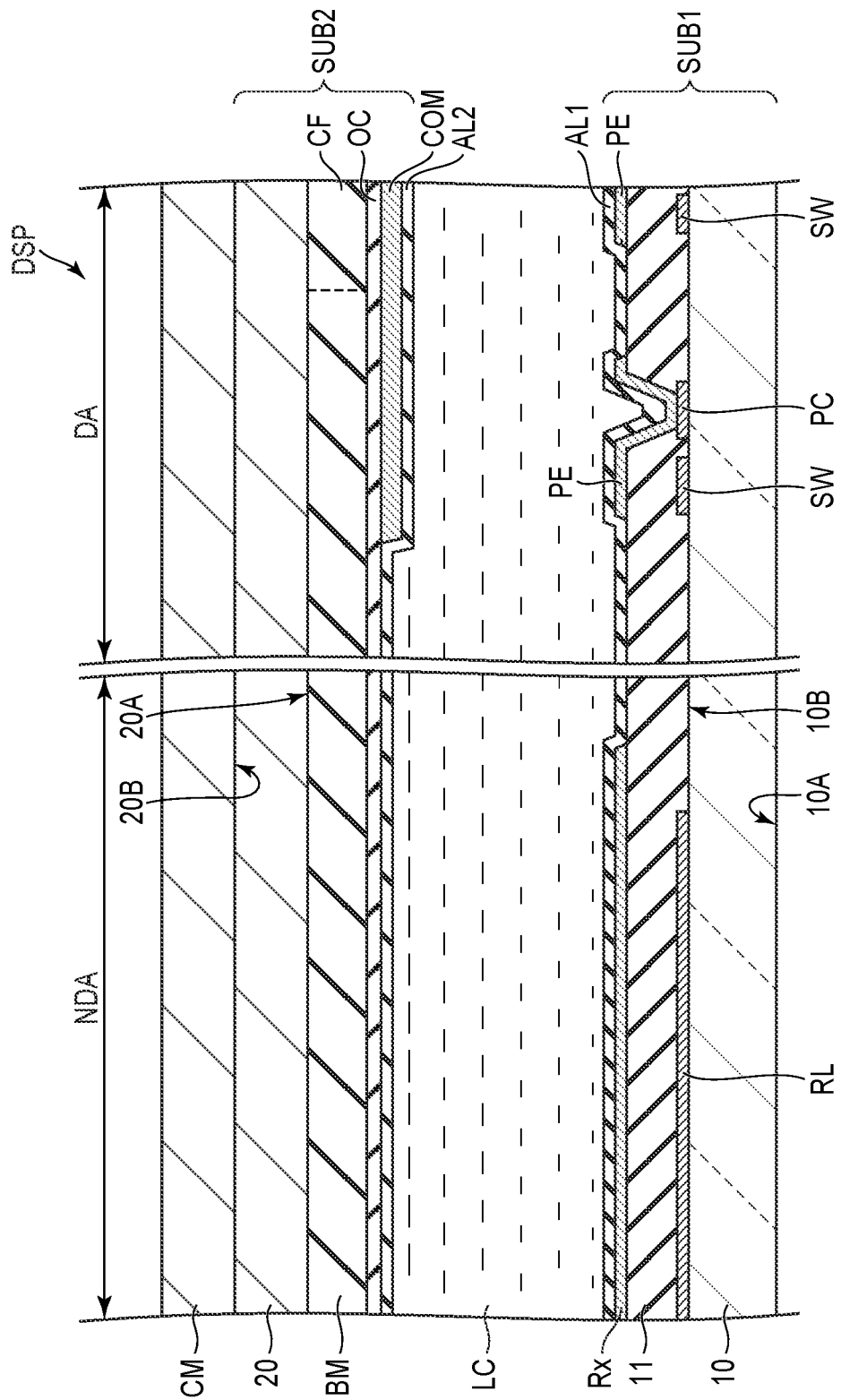
FIG. 11 is a cross-sectional view showing a configuration example of the display device of the embodiment.

In the embodiment described above, as shown in FIG. 2, the detection electrode Rx is disposed on the main surface 20A side of the transparent substrate 20 (in other words, it is disposed on the same layer as that of the common electrode COM), but the detection electrode Rx may be placed on the main surface 20B of the transparent substrate 20 (in other words, it may be placed on a different layer from the common electrode COM) as shown in FIG. 10. Further, in this embodiment, as shown in FIG. 2, the detection electrode Rx is placed on the second substrate SUB2 side, but as shown in FIG. 11, the detection electrode Rx may be placed on the first substrate SUB1 side. The configurations shown in FIGS. 10 and 11 are similar to the configuration already described except that the arrangement of the detection electrode Rx is different. Therefore, when the display area DA is off, the common electrode COM can be set to a high-impedance state, floating state, or a state biased at 50 kΩ or higher, that is, being connected to a predetermined potential with an impedance of 50 kΩ or higher, and the touch on the display area DA can be detected using the detection electrode Rx placed in the non-display area NDA.

Second Embodiment

FIG. 12 is a plan view of a configuration example of the display device DSP of the second embodiment. As shown in FIG. 12, a microcontroller MCU, a battery BT, a second power management circuit PMIC2, a third power management circuit PMIC3, and the like are disposed on the printed circuit board PCB. That is, in the display device DSP of this embodiment, the configuration corresponding to the touch controller TC and the first power management circuit PMIC1 that supplies the power voltage to the touch controller TC in the first embodiment described above are omitted.

The microcomputer MCU comprises an analog front-end circuit AFE in addition to the CPU2 and general-purpose input/output pins GPIO. The CPU2 carries out touch detection based on detection signals input via the analog front-end circuit AFE.

Figure 13:
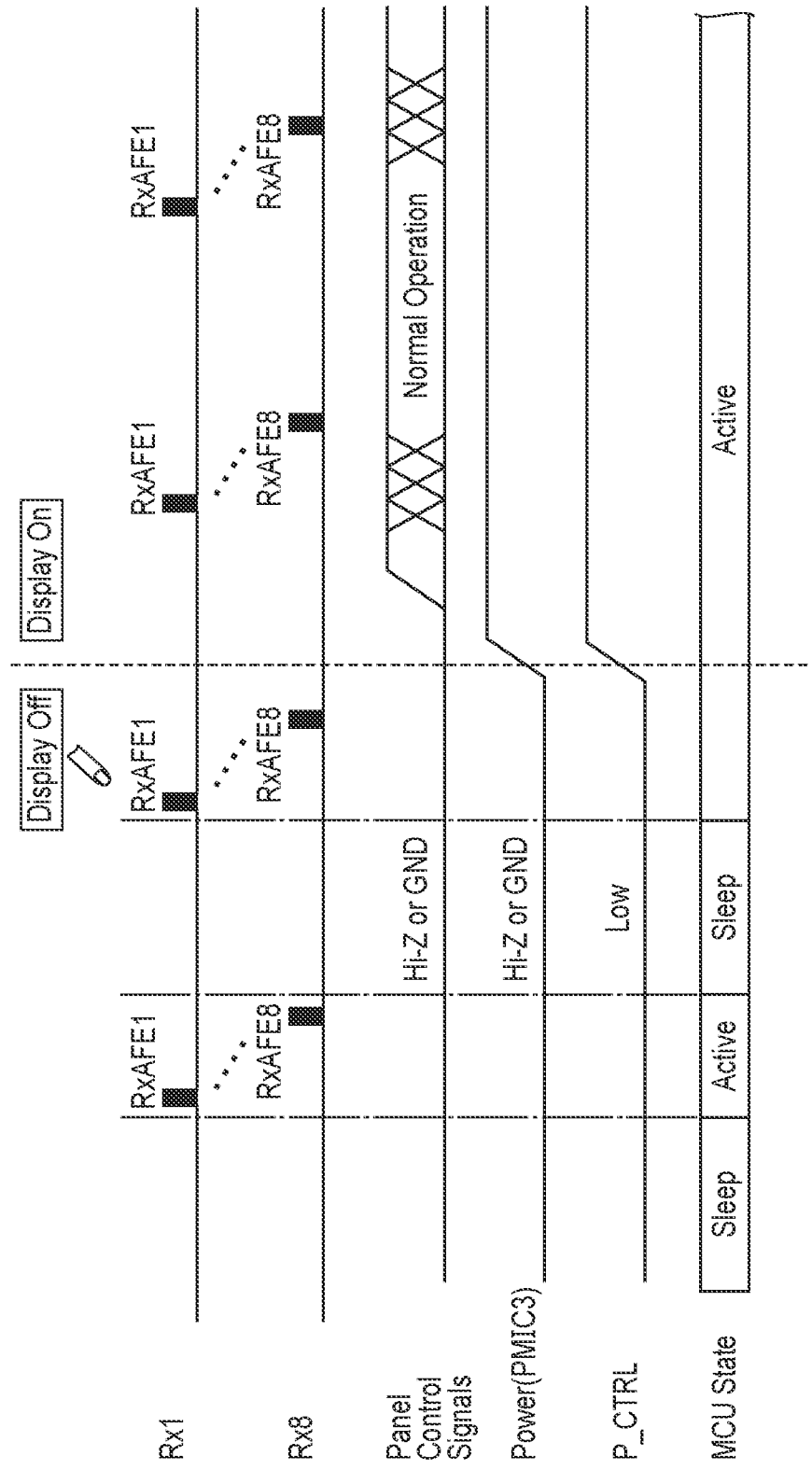
FIG. 13 is a timing chart illustrating an example of the operation of the display device of this embodiment.
Figure 14:
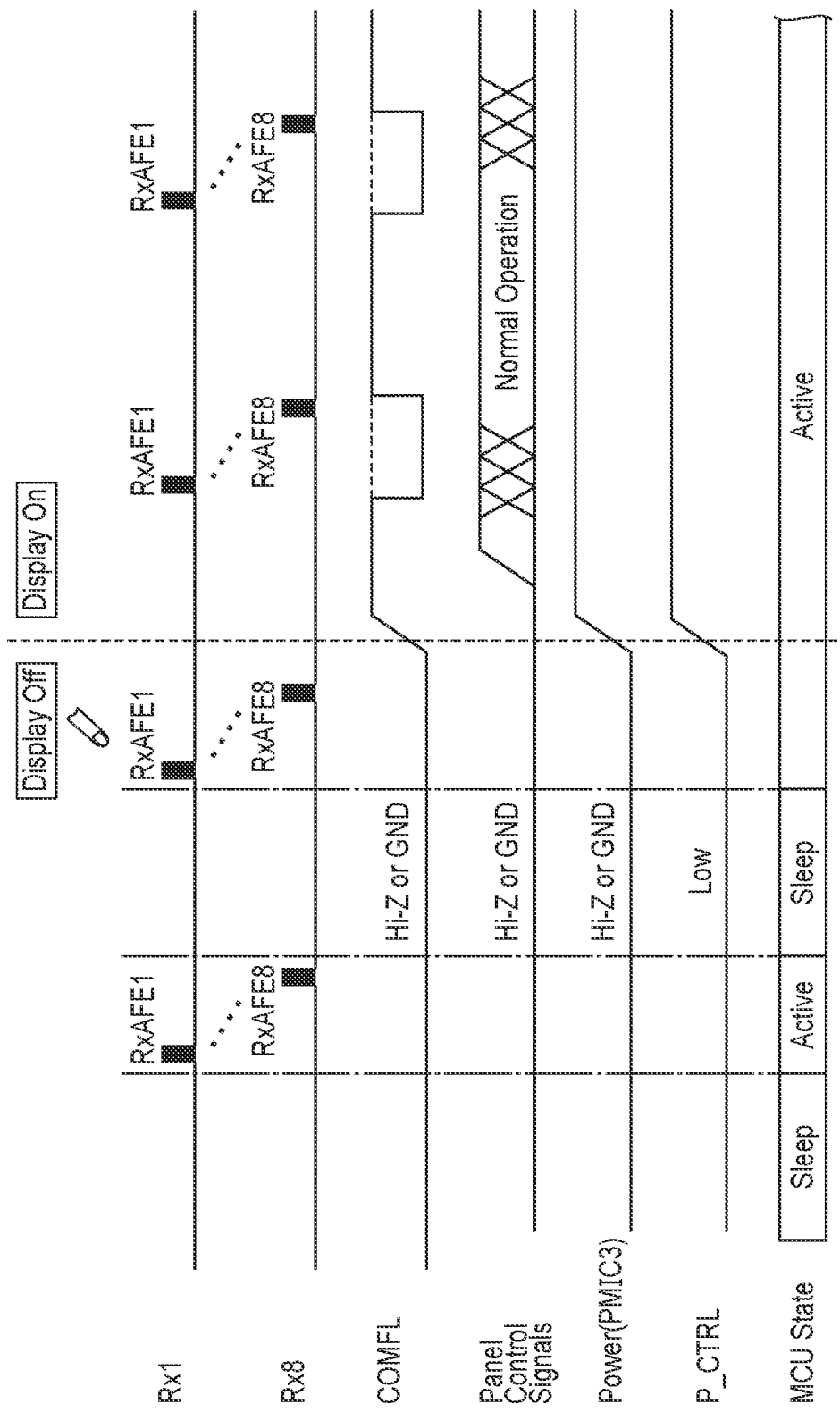
FIG. 14 is a timing chart illustrating an example of the operation of the display device of this embodiment.

As shown in FIG. 13, the microcontroller MCU transitions between the sleep state and the active state alternately when the display DA is off. On the other hand, the microcontroller MCU maintains the active state when the display area DA is on.

When in the active state, the microcontroller MCU supplies drive signals to the detection electrodes Rx1 to Rx8 and acquires detection signals RxAFE1 to RxAFE8 of waveforms corresponding to the drive signals from the detection electrodes Rx1 to Rx8. The microcontroller MCU detects a touch when a predetermined variation is observed in the waveforms of the acquired detection signals RxAFE1 to RxAFE8. In more detail, in the case where a predetermined variation is observed in the waveforms of the detection signals RxAFE1 to RxAFE8 when the display area DA is off, the microcontroller MCU detects a touch on the display area DA. The microcontroller MCU may detect the touch on the display area DA when a predetermined variation is observed in waveforms of a predetermined number or more (for example, three or more) of the detection signals RxAFE1 to RxAFE8 that are acquired when the display area DA is off.

On the other hand, when a predetermined variation is observed in the waveforms of the detection signals RxAFE1 to RxAFE8 when the display DA is on, the microcontroller MCU detects a touch by the detection electrode Rx corresponding to the detection signal RxAFE for which a predetermined variation is observed in its waveform.

As shown in FIG. 13, when the microcontroller MCU detects a touch on the display DA when the display DA is off, it transitions the control signal P_CTRL to the switch PMIC3b included in the third power management circuit PMIC3 from Low to High and turns on the switch PMIC3b. Thus, as shown in FIG. 13, the third power management circuit PMIC3 transitions from off to on. When the third power management circuit PMIC3 is turned on, the display DA transitions from off to on. When the third power management circuit PMIC3 is turned on, the power voltage is supplied to the various circuits disposed in the display panel PNL, and the display control (normal operation) for displaying images on the display area DA is started.

According to the second embodiment described above, the display device DSP comprises a microcontroller MCU that alternately repeats state transitions between the sleep state and the active state even when the display area DA is off. Thus, it is possible to implement the function of the touch controller TC described in the first embodiment described above to the microcontroller MCU, and therefore a configuration which omits the touch controller TC can be realized. Note that the second embodiment is similar to the first embodiment described above except that the microcontroller MCU functions as the touch controller TC, and therefore the display device DSP of this embodiment can achieve advantageous effects similar to those of the first embodiment described above.

FIG. 15 shows an example of application of the display device DSP for each embodiment. As shown in FIG. 15, the display device DSP is applied to a wristwatch 100, for example. In this case, the time, etc., is displayed on the display area DA of the display device DSP, and the display device DSP detects a predetermined gesture by touching a detection electrode located in the non-display area NDA (for example, a gesture to touch the outer circumference of the watch by one rotation clockwise, a gesture to touch the outer circumference of the clock by one rotation counterclockwise, a tapping gesture, etc.). Thus, the operations according to the detected gesture can be realized. Further, as described above, when the display area DA is off, touches on the display area DA can be detected using the detection electrodes, and it is possible to realize operations according to the touches on the display area DA.

FIG. 16 shows another example of application of the display device DSP according to each embodiment. As shown in FIG. 16, the display device DSP is applied to, for example, an in-vehicle rearview mirror 200. In this case, the display area DA of the display device DSP displays images of the rear of the vehicle, etc., taken by a camera installed in the vehicle, and the display device DSP can detect a predetermined gesture when a detection electrode located in the non-display area NDA is touched, thus making it possible to realize the operation according to the detected predetermined gesture.

Figure 17:
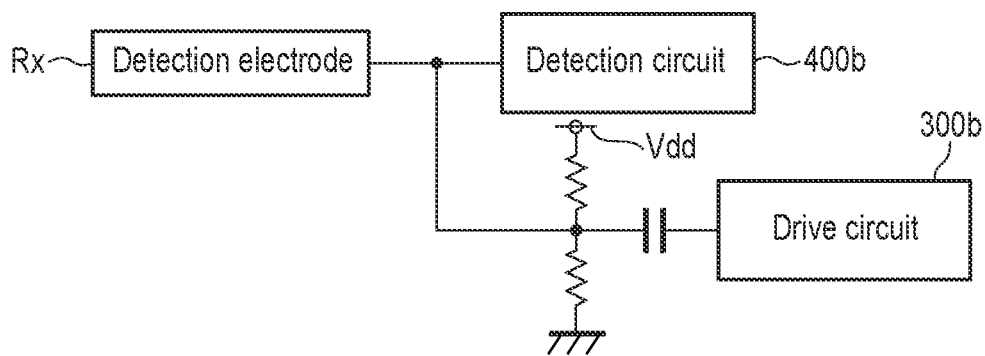
FIG. 17 is a diagram illustrating an example of the principle of touch detection by a self-capacitive system.

FIG. 17 is a diagram illustrating an example of the principle of touch detection by the self-capacitive system. The voltage of the power supply Vdd is divided by the resistor division and supplied to the detection electrode Rx as a bias voltage. A drive signal of a predetermined waveform is supplied from the drive circuit 300b to the detection electrode Rx by capacitive coupling, etc., and a detection signal of a predetermined waveform is read out from the detection electrode Rx. At this time, if a capacitance caused by a finger or the like is loaded on the detection electrode Rx, the amplitude of the detection electrode varies. In FIG. 17, the amplitude of the detection electrode Rx decreases. Therefore, in the equivalent circuit illustrated in FIG. 17, the detection circuit 400b detects the amplitude of the detection electrode Rx to judge whether or not a contact or proximity of an external proximity object such as a finger occurs. The self-detection circuit is not limited to the circuit illustrated in FIG. 17, and any circuit system can be adopted as long as the presence or absence of an external proximity object such as a finger can be detected using only the detection electrode.

According to at least one of the embodiments described above, it is possible to detect not only touches on the detection electrodes Rx1 to Rx8 but also touches on the display area DA using the detection electrodes Rx1 to Rx8 disposed in the non-display area NDA. Thus, it possible to provide a display device, a detection device and a watch that achieve both display quality when displaying images and excellent operability by touch.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate;
a second substrate opposing the first substrate;
a liquid crystal layer held between the first substrate and the second substrate;
at least one first detection electrode disposed in a display area which displays images;
a plurality of second detection electrodes disposed in a peripheral area surrounding the display area;
a drive circuit connected to the first detection electrode and supplying drive pulses to the first detection electrode;

a power management circuit including a power circuit and a first switch provided between the drive circuit and the power circuit; and a second switch provided between the drive circuit and the first detection electrode, during a display period in which images are displayed in the display area, a predetermined voltage for driving the liquid crystal layer being applied to the first detection electrode, and in a period in which the liquid crystal layer is not driven, the first switch and the second switch are turned off and the first detection electrode is set to a state of being not electrically connected to anywhere or to a state of being connected to a predetermined potential with an impedance of 50 kΩ or higher.

2. The display device of claim 1, wherein
the first detection electrode is set to a state of being connected to the predetermined potential with the impedance of 50 kΩ or higher during the period when the liquid crystal layer is not driven.

3. The display device of claim 1, wherein
the first detection electrode and the second detection electrodes are disposed in a same layer.

4. The display device of claim 3, wherein
the first substrate comprises pixel electrodes,
the second substrate comprises the first detection electrode and the second detection electrodes, and
in the display period, the first detection electrode operates as a common electrode for driving the liquid crystal layer, and to which the predetermined voltage is applied.

5. The display device of claim 1, wherein
the first detection electrode and the second detection electrodes are disposed in different layers.

6. The display device of claim 5, wherein
the first substrate comprises pixel electrodes and the second detection electrodes,
the second substrate comprises the first detection electrode, and
in the display period, the first detection electrode operates as a common electrode for driving the liquid crystal layer, and to which the predetermined voltage is applied.

7. The display device of claim 1, wherein
when a predetermined variation is observed in waveforms of a predetermined number or more of detection signals output from the second detection electrodes during the period in which the liquid crystal layer is not driven, the display device determines that an external proximate object is detected by the first detection electrode and cancels a sleep mode.

8. A watch comprising a display device of claim 1.

9. A detection device comprising:
at least one first detection electrode;
a plurality of second detection electrodes disposed in a peripheral area surrounding the first detection electrode;
a drive circuit connected to the first detection electrode and supplying drive pulses to the first detection electrode;
a power management circuit including a power circuit and a first switch provided between the drive circuit and the power circuit; and
a second switch provided between the drive circuit and the first detection electrode,
in a first period, a predetermined voltage being applied to the first detection electrode, and
in a second period, which is different from the first period, the first switch and the second switch are turned off and the first detection electrode is set to a state of being not electrically connected to anywhere or being connected to a predetermined potential with an impedance of 50 kΩ or higher.

10. The detection device of claim 9, wherein
in the first period, the first detection electrode is set to a state of being connected to the predetermined potential with the impedance of 50 kΩ or higher.

11. The detection device of claim 9, wherein
the first detection electrode and the second detection electrodes are disposed in a same layer.

12. The detection device of claim 9, wherein
the first detection electrode and the second detection electrodes are disposed in different layers.

13. The detection device of claim 9, wherein
when a predetermined variation is observed in waveforms of a predetermined number or more of detection signals output from the second detection electrodes during the second period, the detection device determines that an external proximate object is detected by the first detection electrode and cancels a sleep mode.

14. A watch comprising a detection device of claim 9.

* * * * *